(12) United States Patent
Dutra

(10) Patent No.: US 11,618,175 B1
(45) Date of Patent: Apr. 4, 2023

(54) COOKING UTENSIL FOR GROUND MEAT

(71) Applicant: Patricia O. Dutra, Naples, FL (US)

(72) Inventor: Patricia O. Dutra, Naples, FL (US)

( * ) Notice: Subject to any disclaimer, the term of this patent is extended or adjusted under 35 U.S.C. 154(b) by 0 days.

(21) Appl. No.: 17/670,672

(22) Filed: Feb. 14, 2022

(51) Int. Cl.
*B26B 3/04* (2006.01)
*A21C 15/04* (2006.01)
*A47J 43/28* (2006.01)

(52) U.S. Cl.
CPC .............. *B26B 3/04* (2013.01); *A21C 15/04* (2013.01); *A47J 43/288* (2013.01)

(58) Field of Classification Search
CPC .......... A47J 43/288; A47J 45/06; A47J 19/04; B26B 3/00; B26B 3/04; A21C 15/04; A21C 5/00
USPC .......... D7/682; 241/168, 169.2; 30/114, 299, 30/304, 305
See application file for complete search history.

(56) References Cited

U.S. PATENT DOCUMENTS

| | | | |
|---|---|---|---|
| 3,349,824 A | 10/1967 | Trenor | |
| 5,613,431 A * | 3/1997 | Tateno | A47J 17/02 83/437.1 |
| 5,732,616 A | 3/1998 | Bryan | |
| D395,989 S | 7/1998 | Proshan | |
| D446,088 S | 8/2001 | Pardee | |
| 7,159,810 B1 | 1/2007 | Miller | |
| 8,806,759 B2 * | 8/2014 | Cotter | A47J 17/02 30/142 |
| D751,353 S | 3/2016 | Rose | |
| D810,505 S * | 2/2018 | Gonzalez | D7/395 |
| 2016/0015044 A1 * | 1/2016 | Sy | A21C 15/04 30/114 |
| 2020/0047359 A1 * | 2/2020 | Schenk | B26B 3/04 |

* cited by examiner

*Primary Examiner* — Phong H Nguyen
(74) *Attorney, Agent, or Firm* — Loeffler IP Group, P.A.; Bryan L. Loeffler, Esq.

(57) ABSTRACT

A cooking utensil (1) having a curved wall (5) and an angled wall (6) used to efficiently and thoroughly chop and separate ground meat prior to and/or during cooking.

1 Claim, 2 Drawing Sheets

COOKING UTENSIL FOR GROUND MEAT

FIELD OF THE INVENTION

This invention generally relates to kitchen utensils and more particularly, to a cooking utensil used to chop and separate ground meat prior to and/or during cooking.

BACKGROUND OF THE INVENTION

Ground meats, such as hamburger, ground beef, ground poultry, and ground pork are prepared and consumed in a wide variety of dishes. Ground meat is commonly compressed during packaging, thereby causing the meat to stick and clump together. Freezing or refrigeration also contributes to the meat clumping together. Thus, to evenly cook or "brown" ground meat, it must first be separated into smaller pieces. This is often accomplished using a However, the process is often easier said than done, since ground meat is typically moist and fatty and therefore very sticky, tending to rejoin even as a cook attempts to separate it with a spoon or spatula which tends to smash and flatten the ground beef while separating it.

When ground beef is not properly separated before cooking, both the taste and texture of a dish may be affected. In addition, the ground meat may not cook evenly or all the way though. This can be concerning as most ground meats need be cooked to a safe internal temperature throughout to avoid food poisoning.

Therefore, a need exists for a cooking utensil that may be used to efficiently and thoroughly chop and separate ground meat prior to and/or during cooking.

SUMMARY OF THE INVENTION

The primary object of the present invention is to provide a cooking utensil that may be used to efficiently and thoroughly chop and separate ground meat prior to and/or during cooking.

The present invention achieves the above and other objects by providing a cooking utensil having a plurality of blades arranged in a crisscross or grid configuration that are housed within a tubular wall having a handle extending upward therefrom. The tubular wall is preferably tear drop-shaped having a c-shaped or curved section and an angled section. The curved section may be used to process ground meat in round kitchenware or cookware, such as in a bowl or circular-shaped frying pan. The angled section may be used to process ground meat in square kitchenware or cookware having corners, such as a casserole dish or a square-shaped skillet.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
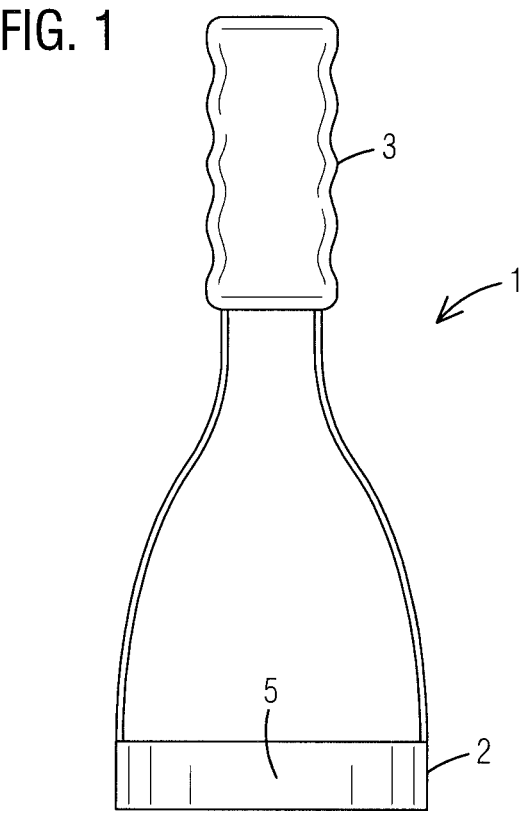
FIG. 1 is a front view of a cooking utensil for ground meat of the present invention.
Figure 2:
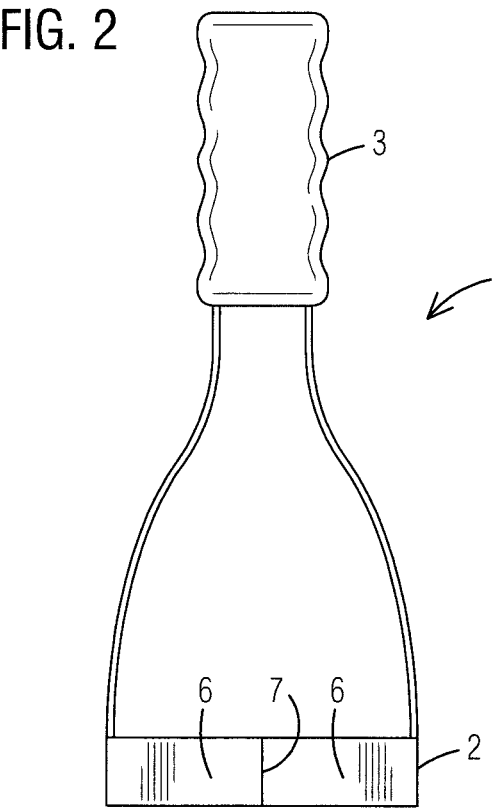
FIG. 2 is a rear view of the cooking utensil for ground meat of the present invention.

For purposes of describing the preferred embodiment, the terminology used in reference to the numbered accessories in the drawings is as follows:

1. cooking utensil, generally
2. perimeter wall
3. handle
4. blade
5. curved section of perimeter wall
6. angled section of perimeter wall
7. angle With reference to FIG. 1-4, a cooking utensil 1 of the present invention is illustrated. The cooking utensil 1 comprises a vertically oriented perimeter wall 2 having an elongated handle 3 extending upward therefrom. The perimeter wall 2 houses a plurality of vertically oriented blades 4 arranged in a crisscross or grid pattern.

Figure 3:
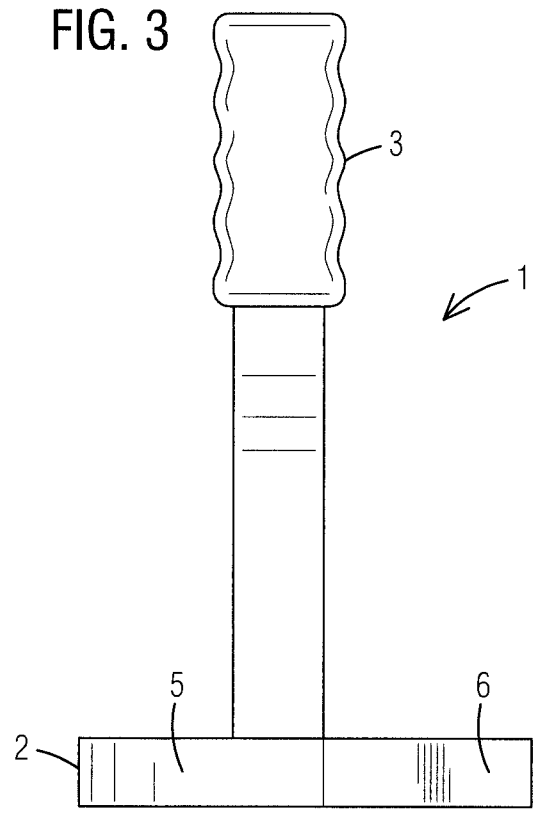
FIG. 3 is a right side view of the cooking utensil for ground meat of the present invention.
Figure 4:
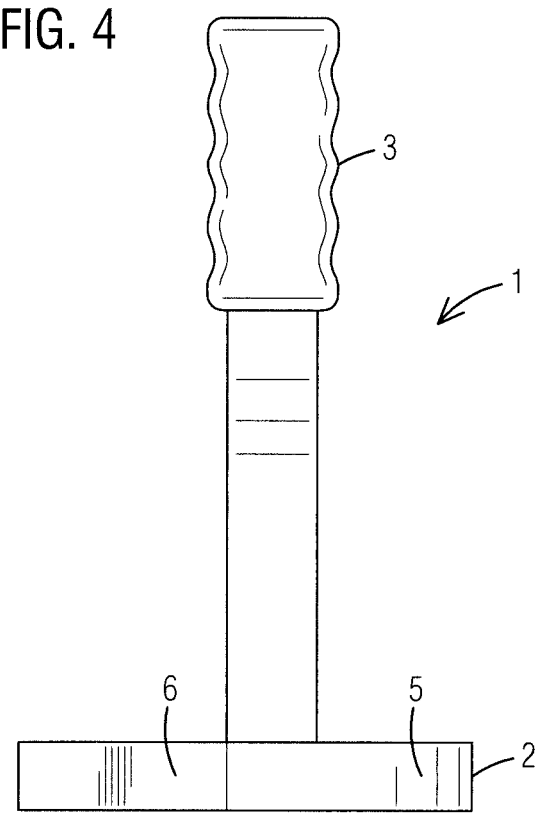
FIG. 4 is a left side view of the cooking utensil for ground meat of the present invention.
Figure 5:
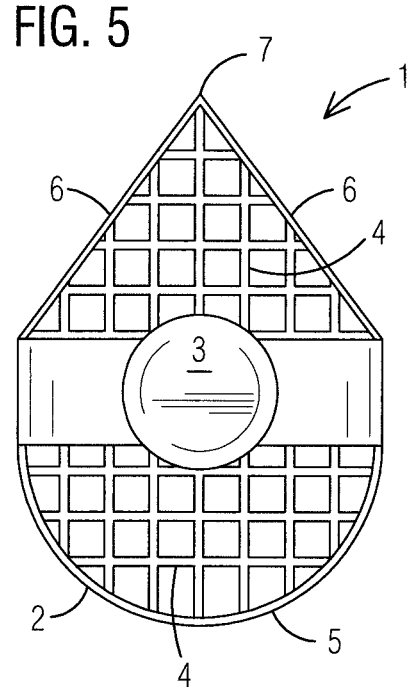
FIG. 5 is a top view of the cooking utensil for ground meat of the present invention.
Figure 6:
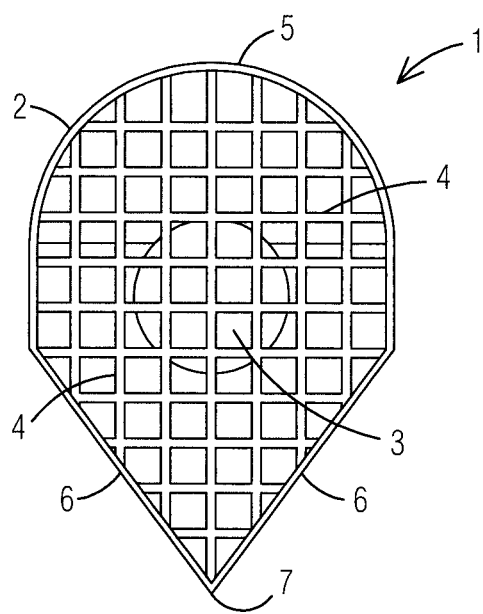
FIG. 6 is a bottom view of the cooking utensil for ground meat of the present invention.

As illustrated in FIGS. 3 and 4, the perimeter wall 2 comprises a curved section 5 and an angled section 6 that form a tear-drop style shape. The curved section 3 is substantially C-shaped and may be used to process ground meat in round kitchenware or cookware, such as in a bowl or circular-shaped frying pan. The angled section 6 comprises a substantially right angle 7 or bend that may be used to process and chop ground meat in square kitchenware or cookware, such as a casserole dish or a square-shaped skillet.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention I claim:

1. A cooking utensil for processing ground meat, said cooking utensil comprising:
   a vertically oriented perimeter wall having an elongated handle extending upward therefrom;
   said perimeter wall housing a plurality of vertically oriented blades arranged in a grid pattern;
   said perimeter wall having a C-shaped curved section for processing ground meat in cookware having curved corners; and
   said perimeter wall having an angled section opposite from said curved section for processing ground meat in cookware having angled corners.

* * * * *